(12) United States Patent
Nilsson et al.

(10) Patent No.: US 12,358,684 B2
(45) Date of Patent: Jul. 15, 2025

(54) CONTAINER AND METHOD FOR PRODUCING A CONTAINER

(71) Applicant: Elfa International AB, Västervik (SE)

(72) Inventors: Peter Nilsson, Västervik (SE); Tobias Ringenhag, Västervik (SE)

( * ) Notice: Subject to any disclaimer, the term of this patent is extended or adjusted under 35 U.S.C. 154(b) by 0 days.

(21) Appl. No.: 18/069,963

(22) Filed: Dec. 21, 2022

(65) Prior Publication Data
US 2023/0192355 A1    Jun. 22, 2023

(30) Foreign Application Priority Data
Dec. 21, 2021   (SE) .................................. 2151577-0

(51) Int. Cl.
| | |
|---|---|
| B65D 6/08 | (2006.01) |
| B21D 5/16 | (2006.01) |
| B21D 28/26 | (2006.01) |
| B21D 51/52 | (2006.01) |
| B65D 6/04 | (2006.01) |

(52) U.S. Cl.
CPC .................. B65D 7/16 (2013.01); B21D 5/16 (2013.01); B21D 28/26 (2013.01); B21D 51/52 (2013.01); B65D 7/08 (2013.01)

(58) Field of Classification Search
CPC ....... Y10T 29/18; Y10T 29/185; B21D 47/02; B21D 31/04; B21D 31/043; B21D 31/046; B21D 57/52
See application file for complete search history.

(56) References Cited

U.S. PATENT DOCUMENTS

| | | | | |
|---|---|---|---|---|
| 1,224,877 | A | * | 5/1917 | Clark .................... B21D 31/046 29/6.1 |
| 1,408,026 | A | * | 2/1922 | Ochiltree .................. B42F 7/10 206/557 |
| 1,561,272 | A | * | 11/1925 | Nagel .................... B21D 31/04 29/6.2 |

(Continued)

FOREIGN PATENT DOCUMENTS

| | | |
|---|---|---|
| DE | 672476 | 3/1939 |
| DE | 672476 C | 3/1939 |

(Continued)

OTHER PUBLICATIONS

Office Action (Non-Final Rejection) dated Jan. 31, 2024 for U.S. Appl. No. 17/355,122 (pp. 1-9).

(Continued)

*Primary Examiner* — Jason L Vaughan
(74) *Attorney, Agent, or Firm* — Marc A. Hubbard; Hubbard Law, PLLC

(57) ABSTRACT

The present disclosure relates to a mesh container and a method of making a mesh container that has a first and a second set of opposing side panels, a bottom panel, and a rim directed outwards from the upper edges of the side panels. At least two adjacent sides panels of the container and portion of the rim directed outwardly from the upper edge of the side panels are made from a sheet metal precursor with least one perforated and a stretched portion and unstretched metal portion. The precursor is folded so that the unstretched metal portion joins the two side panels and is bent to form the rim. A notch is cut from the edge of the unstretched metal portion where it is bent at the corner formed by the two side panels.

17 Claims, 7 Drawing Sheets

(56) References Cited

U.S. PATENT DOCUMENTS

| | | | |
|---|---|---|---|
| 2,502,781 A * | 4/1950 | Erickson | B60R 9/04 |
| | | | 220/628 |
| 3,165,810 A * | 1/1965 | Agler | B21D 31/043 |
| | | | 29/6.2 |
| 3,218,689 A * | 11/1965 | Mumma | B21D 31/043 |
| | | | 29/6.2 |
| 3,351,995 A * | 11/1967 | Johnson | B21D 31/043 |
| | | | 29/6.1 |
| 4,205,406 A | 6/1980 | Spector | |
| 4,594,280 A * | 6/1986 | Coyon | B21D 53/04 |
| | | | 264/282 |
| 6,050,048 A | 4/2000 | Hellsten | |
| 6,629,016 B1 | 9/2003 | Smith | |
| 6,700,059 B1 | 3/2004 | Enmoto | |
| 8,141,737 B1 | 3/2012 | Tsai | |
| 8,146,218 B1 * | 4/2012 | Ealer, Sr. | E04D 13/076 |
| | | | 52/12 |
| D748,916 S | 2/2016 | Nilsson | |
| 9,398,819 B2 | 7/2016 | Tsai | |
| D766,634 S | 9/2016 | Nilsson | |
| D770,206 S | 11/2016 | Nilsson | |
| D773,216 S | 12/2016 | Nilsson | |
| D775,467 S | 1/2017 | Nilsson | |
| 9,586,718 B2 * | 3/2017 | Tsai | B65D 7/12 |
| D784,745 S | 4/2017 | Nilsson | |
| D807,641 S | 1/2018 | Nilsson | |
| D808,269 S | 1/2018 | Colombo | |
| 9,869,115 B2 | 1/2018 | Nilsson | |
| 9,879,460 B2 | 1/2018 | Nilsson | |
| D819,732 S | 6/2018 | Nilsson | |
| D821,749 S | 7/2018 | Nilsson | |
| D823,622 S | 7/2018 | Nilsson | |
| 10,016,057 B1 | 7/2018 | Arnautovic | |
| 10,028,582 B2 | 7/2018 | Nilsson | |
| 10,051,958 B2 | 8/2018 | Andersson | |
| 10,104,959 B2 | 10/2018 | Nilsson | |
| D839,029 S | 1/2019 | Nilsson | |
| D843,149 S | 3/2019 | Nilsson | |
| 10,287,057 B2 | 5/2019 | Nilsson | |
| D869,195 S | 12/2019 | Nilsson | |
| D882,290 S | 4/2020 | Nilsson | |
| 10,674,817 B1 | 6/2020 | Cao | |
| 10,906,706 B2 | 2/2021 | Nilsson | |
| D973,476 S | 12/2022 | Ryden | |
| D984,257 S | 4/2023 | Nilsson | |
| 2003/0102315 A1 | 6/2003 | Cheng | |
| 2005/0077299 A1 * | 4/2005 | Cheng | A47B 55/02 |
| | | | 220/485 |
| 2009/0235506 A1 * | 9/2009 | Castricum | B01D 29/111 |
| | | | 72/367.1 |
| 2016/0052665 A1 | 2/2016 | Tsai | |
| 2016/0144999 A1 * | 5/2016 | Tang | B65D 7/14 |
| | | | 220/493 |
| 2018/0339800 A1 | 11/2018 | Cao | |
| 2018/0352953 A1 | 12/2018 | Nilsson | |
| 2019/0110593 A1 | 4/2019 | Nilsson et al. | |
| 2019/0284815 A1 | 9/2019 | Schlipper | |
| 2020/0113329 A1 | 4/2020 | Nilsson | |
| 2020/0154887 A1 | 5/2020 | Nilsson | |
| 2020/0196757 A1 | 6/2020 | Nilsson | |
| 2020/0317403 A1 | 10/2020 | Nilsson | |
| 2020/0323340 A1 | 10/2020 | Nilsson | |
| 2021/0061683 A1 | 3/2021 | Campbell | |
| 2021/0133240 A1 | 5/2021 | Talbot | |
| 2021/0133241 A1 | 5/2021 | Xu | |
| 2021/0274933 A1 | 9/2021 | Nilsson | |
| 2021/0337966 A1 | 11/2021 | Nilsson | |
| 2021/0337967 A1 | 11/2021 | Nilsson | |
| 2021/0394954 A1 | 12/2021 | Nilsson | |
| 2022/0047071 A1 | 2/2022 | Nilsson | |
| 2022/0338627 A1 | 10/2022 | Ringenhag | |
| 2023/0023464 A1 | 1/2023 | Nilsson | |
| 2023/0026525 A1 | 1/2023 | Nilsson | |
| 2023/0192355 A1 | 6/2023 | Nilsson | |
| 2023/0276940 A1 | 9/2023 | Nilsson | |

FOREIGN PATENT DOCUMENTS

| | | |
|---|---|---|
| DE | 202011051625 U1 | 12/2011 |
| DE | 202018107059 | 1/2019 |
| DE | 202018107059 U | 1/2019 |
| DE | 202021101491 | 4/2021 |
| DE | 202021101491 U | 4/2021 |
| EP | 1424287 A1 | 6/2004 |
| EP | 4201543 | 6/2023 |
| ES | 2265203 A1 | 2/2007 |
| FR | 1444104 | 7/1966 |
| GB | 143962 | 5/1920 |
| GB | 143962 A | 5/1920 |
| GB | 2604659 B | 5/2023 |
| SE | 2151577 A1 | 6/2023 |
| WO | 2021262070 | 12/2021 |

OTHER PUBLICATIONS

Third Party Submission Pursuant to 37 CFR 1.290, U.S. Publication No. 2021/0394954, 22 pages.

European Search Report issued in App. No. EP22214066, dated May 3, 2023, 4 pages.

International Search Report and Written Opinion received in Patent Cooperation Treaty Application No. PCT/SE2016/051192, dated Feb. 28, 2017, 14 pages.

Swedish Search Report issued in SE App. No. 2151577-0, 1 page, Dated Sep. 16, 2022.

Written Opinion of the International Searching Authority, International Application No. PCT/SE2021/050609, Dated Sep. 19, 2021, 5 pages.

Search Report received from Swedish Application No. 2151577-0, dated Sep. 16, 2022.

* cited by examiner

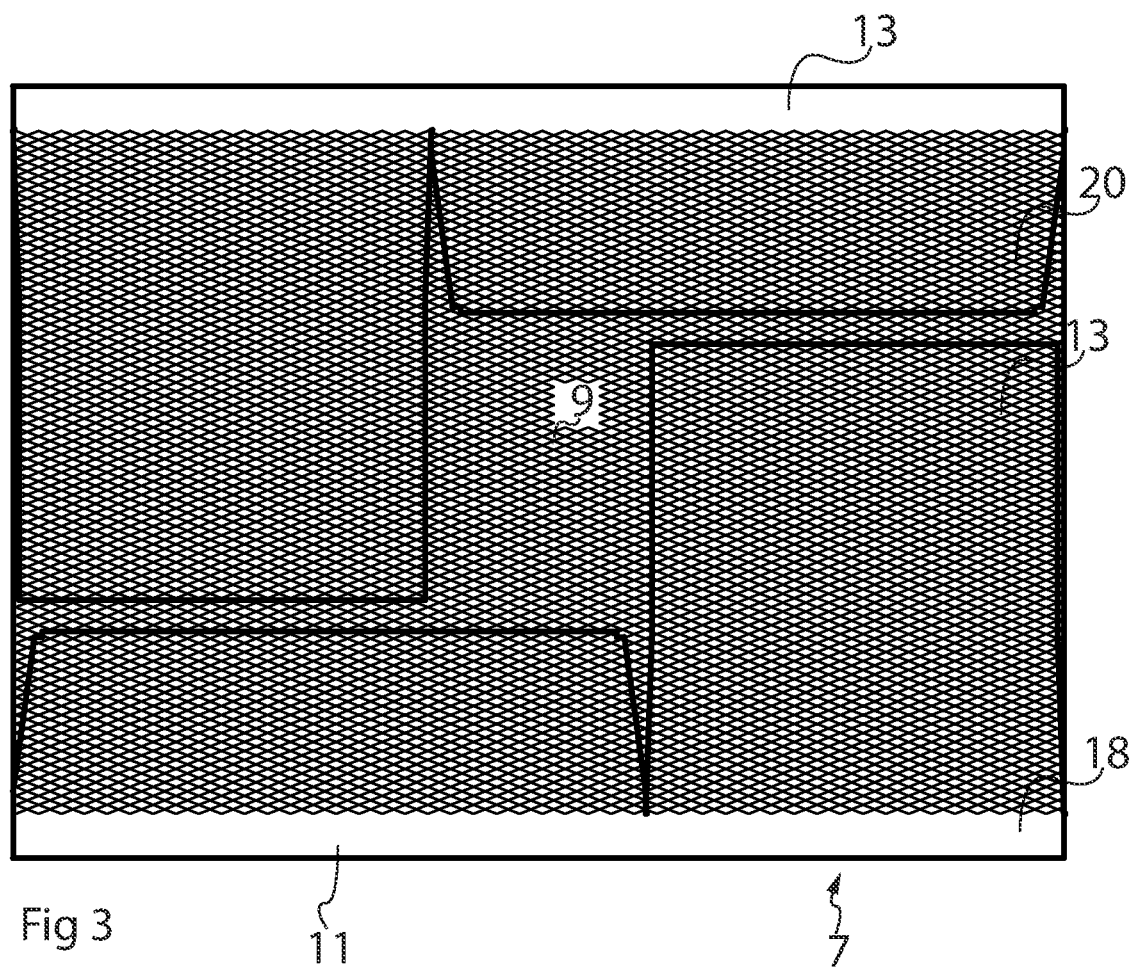
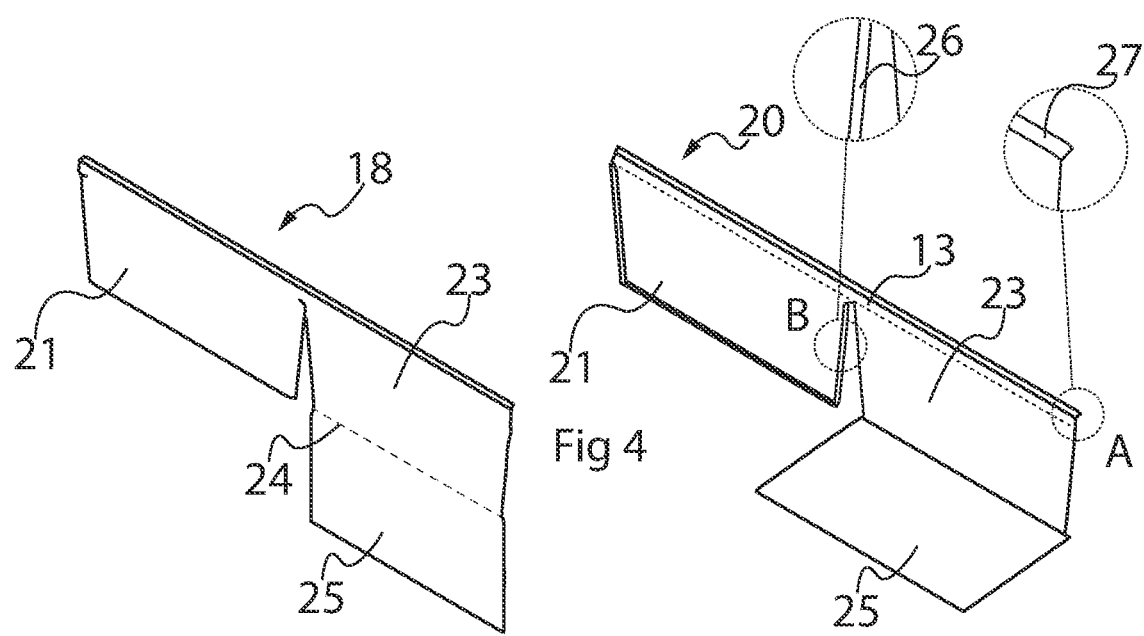

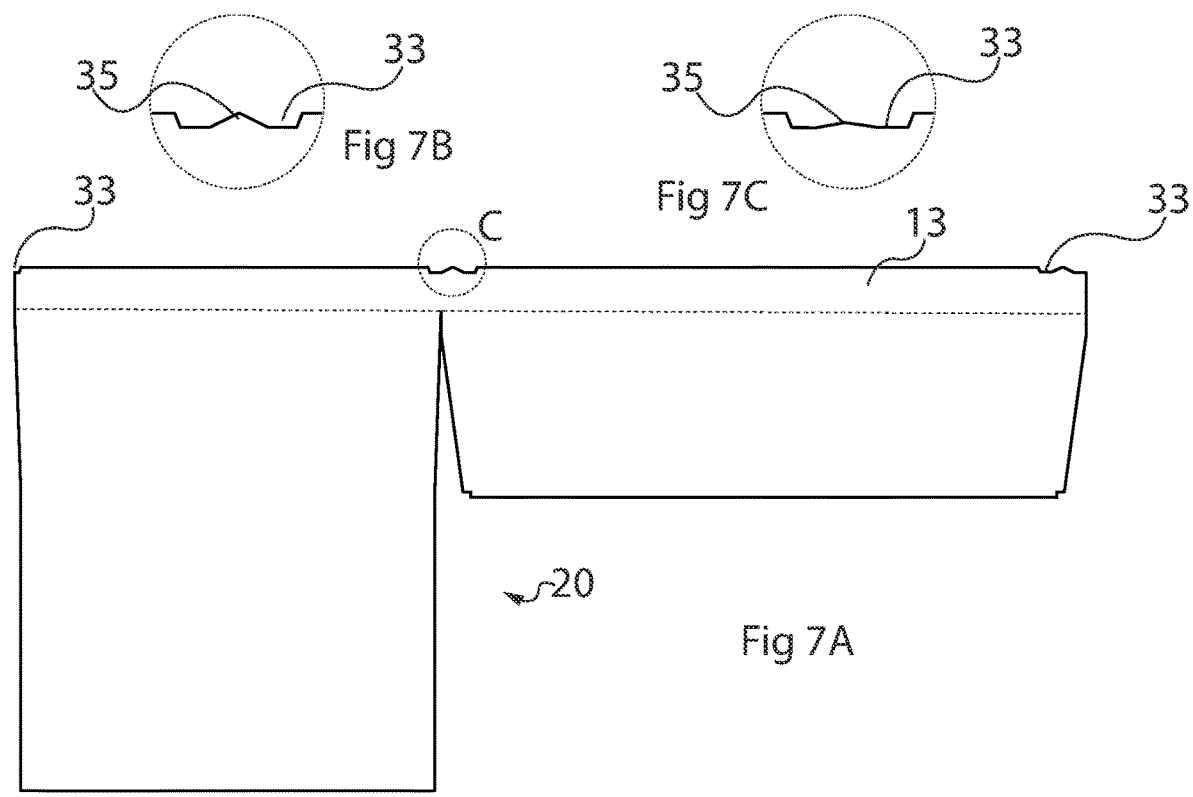
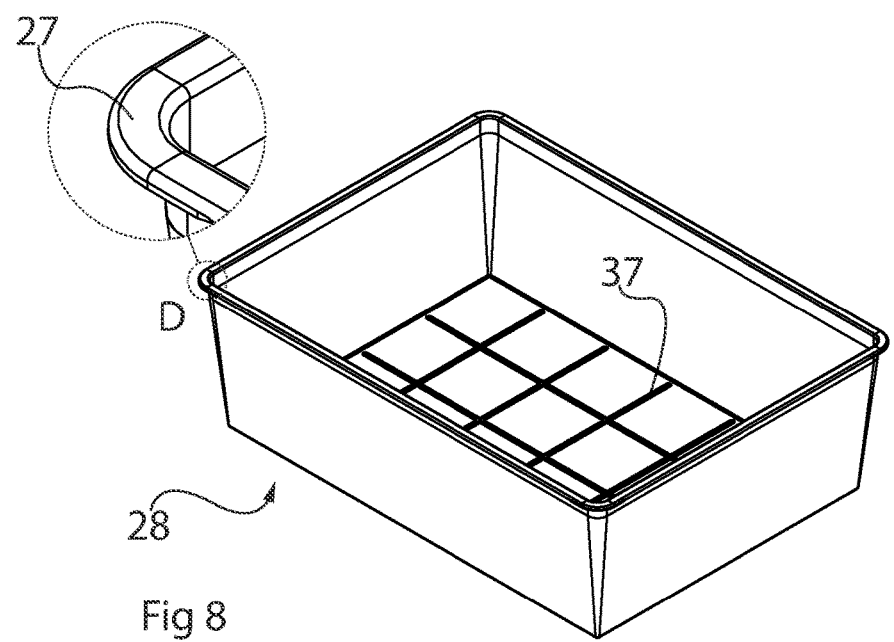

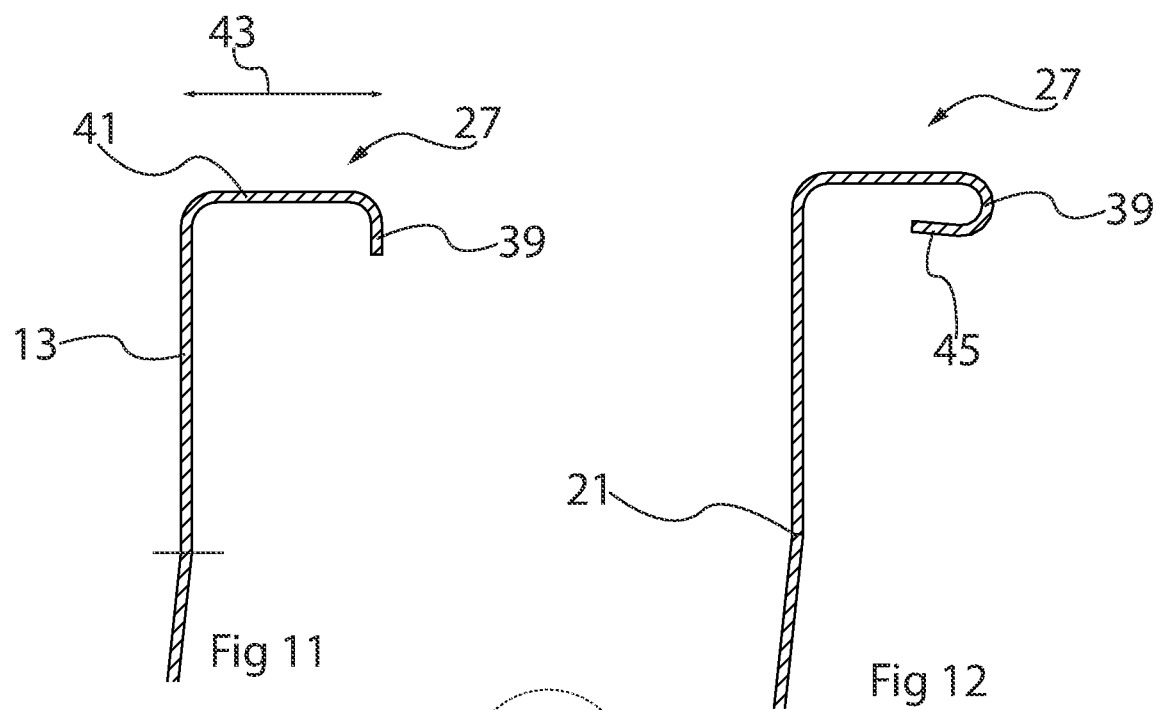
Fig 11
Fig 12
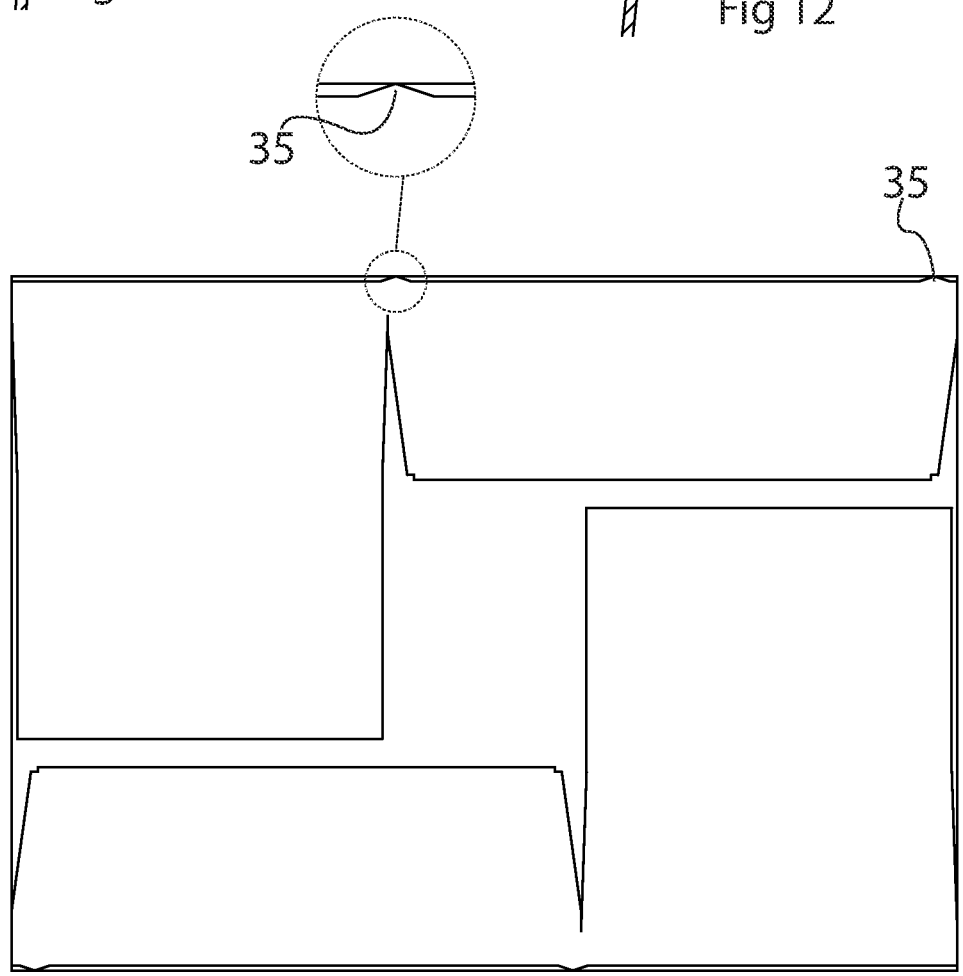
Fig 13

CONTAINER AND METHOD FOR PRODUCING A CONTAINER

This application claims priority to Swedish patent application number 2151577-0, filed Dec. 21, 2021, which is incorporated herein by reference in its entirety for all purposes.

TECHNICAL FIELD

The present disclosure relates to a method for producing containers in mesh material comprising expanded sheet metal.

BACKGROUND

Such a container is described, for instance, in EP-1424287-A1, where a container is formed from three mesh pieces, and a non-mesh rail is fitted to the upper edges of the container to form a rim or frame. One problem with mesh containers of this kind is how to produce them efficiently to enable low-cost manufacturing.

SUMMARY

The invention is directed generally to making a container made of expanded metal mesh with improved efficiency. Disclosed below are representative examples and embodiments of production methods of making such containers and containers made with such production methods.

BRIEF DESCRIPTION OF THE DRAWINGS

FIG. 3 illustrates how panel portions of a container are cut in the precursors.

FIGS. 4 and 5 illustrate a container being formed from the precursors.

FIGS. 7A-7C illustrate features of a panel portion modified according to a first example of the present disclosure.

FIGS. 8-9 shows a finished container in different perspective views.

FIGS. 11 and 12 illustrated different versions of rim cross-sections.

FIGS. 13, 14, and 15 illustrate, corresponding to FIGS. 7A, 9, and 10, the production of a container according to an alternative example.

DETAILED DESCRIPTION

The present disclosure relates to methods for producing containers in mesh materials and containers in mesh materials.

Figure 1:
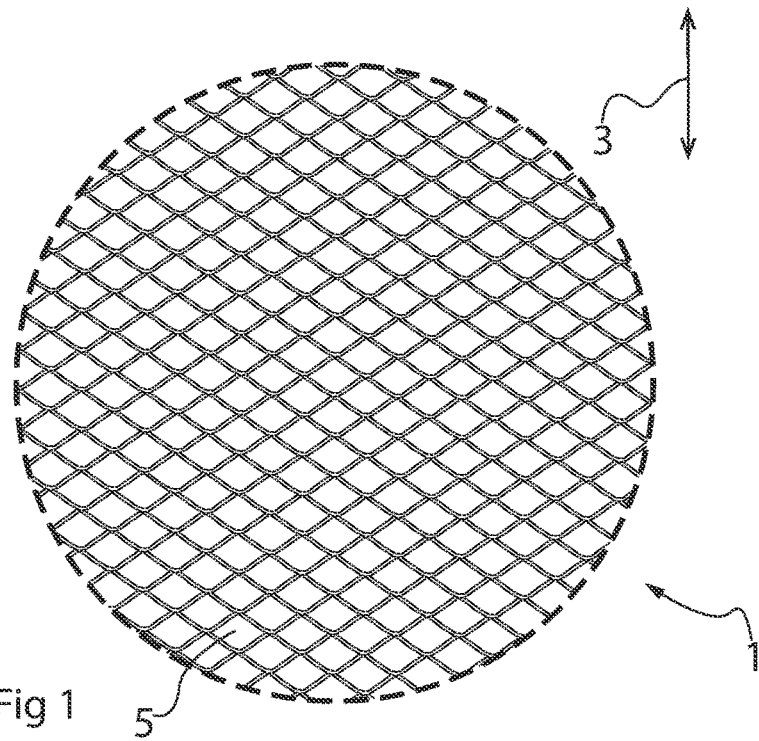
FIG. 1 shows a mesh material.

Mesh material, an example of which is shown in FIG. 1 and referenced as 1, is formed from sheet metal with openings that are then expanded to widen those openings. Typically, the sheet metal may be pierced with short line-shaped openings and stretched or expanded along a stretch direction 3 to form e.g., diamond-shaped openings 5 in the sheet metal, as illustrated in FIG. 1. Typically cutting and stretching take place in a single step where the tool cutting the line shaped opening also widens that opening to its final shape.

EP-1424287-A1 describes a method for producing a container for a drawer system. The container comprises upper rail and a basket portion coupled thereto. The basket portion comprises panels of mesh material. In one illustrated example, the basket is formed by three separate mesh pieces, one typically forming the bottom and two opposing side walls, while the other two form the remaining two side walls in a rectangular basket. Seams are formed between the separate parts and a rail may be welded at the rim of the container.

In the present disclosure an improved method of producing a mesh container is described.

In the present disclosure, rather than separately forming pieces making up different panels of a container by cutting up a perforated, stretched web of sheet metal, welding those pieces together and attaching a separate rail at the rim of the container, the container is formed almost as a whole already from a single web of sheet metal by preparing mesh metal container precursors.

One example of a production for such a container includes perforating and expanding a web of sheet metal along an expansion direction to form the mesh material, while leaving at least one portion of the web unstretched, and cutting at least one precursor from the web. A container is folded including the at least one precursor wherein said at least one precursor makes up, in one piece, at least a side panel in the first set of side panels and a side panel in the second set of side panels, which are joined by the unstretched portion. That portion is bent to form a corner of the rim. A notch is cut from the edge of the unstretched portion where said corner of the rim is to be made. Thanks to the notch in the unstretched portion, the corner can be formed with a smaller radius allowing for a container with a more rectangular cross section.

The notch may be formed in the same step as the precursor is cut from the web.

A tab may be left in the middle of the notch such that the cross section of the rim remains approximately uniform throughout the corner despite being stretched in the bending step. The tab may project 1-6 mm from the bottom of the notch and be between 25-40 mm wide at its base. The notch may be between 3 and 7 mm deep as seen from the outer, unstretched edge of the precursor where the cut is made and may be between 35 and 50 mm wide at its inner end as seen from the outer, unstretched edge of the precursor where the cut is made. The notch width may taper towards its inner end as seen from the outer, unstretched edge of the precursor where the cut is made.

The rim may comprise a flange portion bent from the unstretched portion of a side panel, and a downwards projecting flange portion may be bent from the first flange portion. Those flange portions may be bent prior to forming corners of the container. An inwards projecting portion may be bent from the downwards projecting flange after forming the corners of the container.

The present disclosure also considers a mesh material container, comprising expanded sheet metal mesh, the container having a first and a second set of opposing side panels, a bottom panel, and a rim directed outwards from the upper edges of the side panels. At least one side panel in the first set of side panels and one side panel in the second set of side panels are made in one piece, being joined by an unstretched piece of sheet metal forming the rim, which is bent to form a corner of the rim. A notch is cut from the edge of the unstretched portion at the location of said corner.

The present disclosure also considers a method for producing a container in a mesh material, comprising expanded sheet metal, the container having a first and a second set of opposing side panels, a bottom panel, and a rim directed outwards from the upper edges of the side panels. The method includes perforating and expanding a web of sheet metal along an expansion direction to form said mesh material, while leaving at least one portion of the web unstretched. At least one precursor is cut from the web. A container is made including said at least one precursor wherein said at least one precursor makes up, in one piece, at least a side panel in the first set of side panels and a side panel in the second set of side panels, which are joined by said unstretched portion which is bent to form a corner of the rim. The unstretched portion is cut such that a tab projects from the edge of the unstretched portion where said corner of the rim is to be made. When the corner is formed, this tab is drawn out, making the rim cross section more uniform throughout the corner. The tab may extend 1-6 mm from the edge and be between 25-40 mm wide at its base.

The present disclosure also considers a mesh material container made with expanded sheet metal mesh, the container having a first and a second set of opposing side panels, a bottom panel, and a rim directed outwards from the upper edges of the side panels. At least one side panel in the first set of side panels and one side panel in the second set of side panels made in one piece are joined by an unstretched piece of sheet metal forming said rim, which is bent to form a corner of the rim. The edge of the unstretched portion is cut to form a tab extending from the edge at the location of said corner such that, when bent, the rim is given a more uniform cross section throughout the corner.

Figure 2:
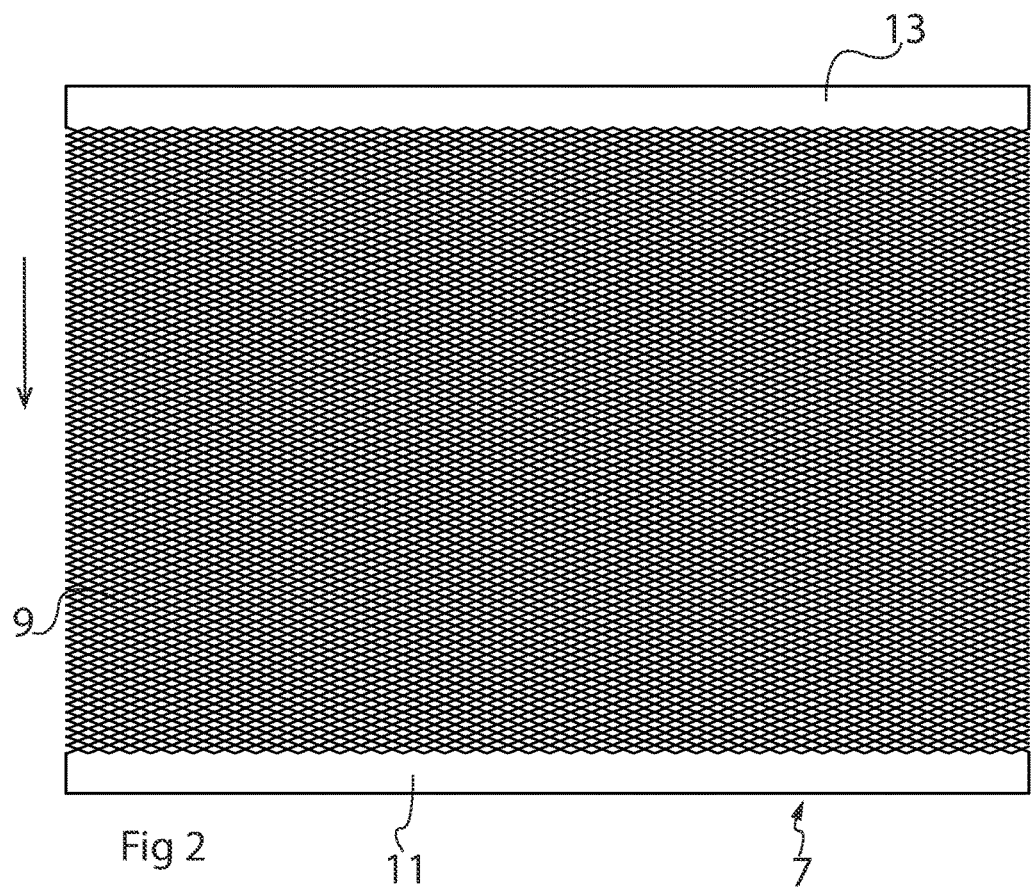
FIG. 2 illustrates a partly stretched web of sheet metal for forming a precursor.

FIG. 2 schematically illustrates a partly stretched web 7 of sheet metal. This web may be formed from the entire width of a roll of sheet metal, typically steel. The web may have different widths depending on the desired size of the finished container, for example 1.2 meters.

The web may be produced from the roll in the direction illustrated by the arrow of FIG. 2. It may be perforated and expanded by a processing machine along an expansion direction that may coincide with the indicated direction. The processing machine may simultaneously cut and expand the material with sets of knives that first provide a cut transversely to the feed direction of the roll and then widens this cut into an almost rhomboid shape by driving the knife, having a widening cross section, further through the cut.

The web 7 of sheet metal is thus cut across and expanded along an expansion direction 3. However, a leading 11 and a trailing 13 portion of the web 7 is left uncut/-stretched with an intervening cut and stretched portion 9. After the trailing web portion 13, the web 7 is separated from the remainder of the roll.

The web 7 formed as illustrated in FIG. 2 is then cut to form two precursors 18, 20 for making a mesh container as shown in FIG. 3. This is done by cutting the web 7 across the stretched portion 9 as shown. Further, some parts of the stretched portion 9 are removed to form the precursors 18, 20, although the waste is small.

In FIG. 3, the leading web part (bottom) and the trailing web part (top) each form a container precursor 18, 20 that combined together will form a container, although they could of course also be combined with precursors from other parts of the sheet metal web 7. In that container, the rim part will be formed from the unstretched portions 11, 13 as will be shown. Each unstretched part 11, 13 will extend bent past one corner of the box, and in the present disclosure, that bending is facilitated by an adaptation of the unstretched part as will be discussed in detail, although not depicted in the schematic drawing of FIG. 3.

Figure 5:
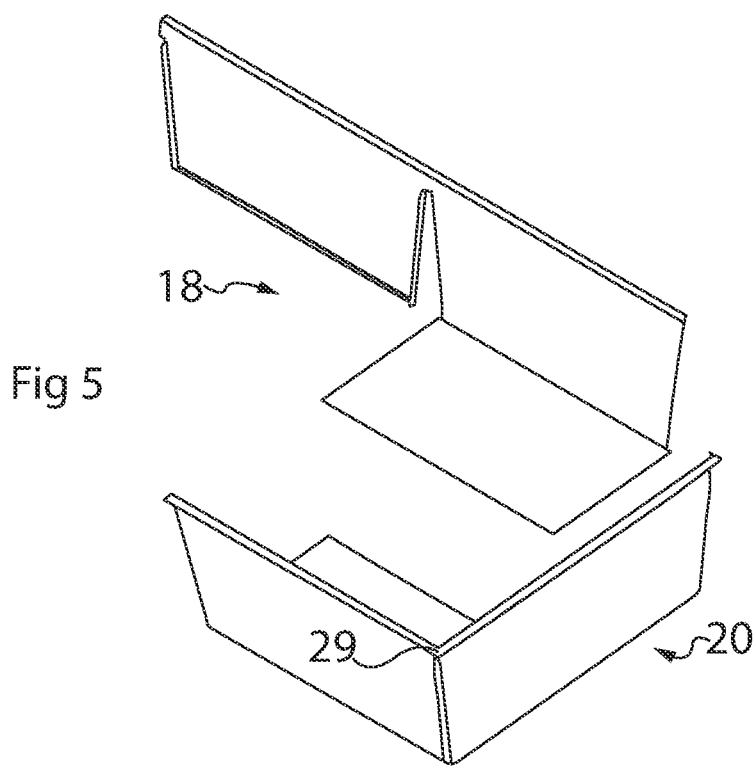

FIGS. 4 and 5 illustrate a container being formed from the precursors 18, 20 of FIG. 3. In the illustrated case, the precursors have the same surface layout, although they will not be identical as the mesh pattern extends in opposite directions on the surfaces. From the precursors 18, 20 of FIG. 4 a long side panel 21, a short side panel 23 and one half of a bottom panel 25 will be formed, the latter by folding from the short side panel 23 along a folding line 24. As seen in the enlarged portion A of the other precursor 20, the top end of the web, at the unstretched portion 13 (the limit of which is indicated with a dashed line in the right-hand part of FIG. 4) is folded outwards to form an outward flange 27 at the rim of the container, as will be discussed in detail. Further, as shown at the enlarged portion B, tabs 26 may be folded from the lower part of the long side panel 21 to facilitate welding to neighbouring panels when the container is assembled.

FIG. 5 illustrates the continued assembling of the precursors 18, 20 of FIG. 4. Each precursor is then bent at the unstretched part forming a corner 29, such that the long side panel 21 can be adjoined with the short side panel 23, and the bottom panel piece 25 extending therefrom. The two precursors are then welded at mating edges to form a finished container that can be painted and then may be ready for use.

Figure 6:
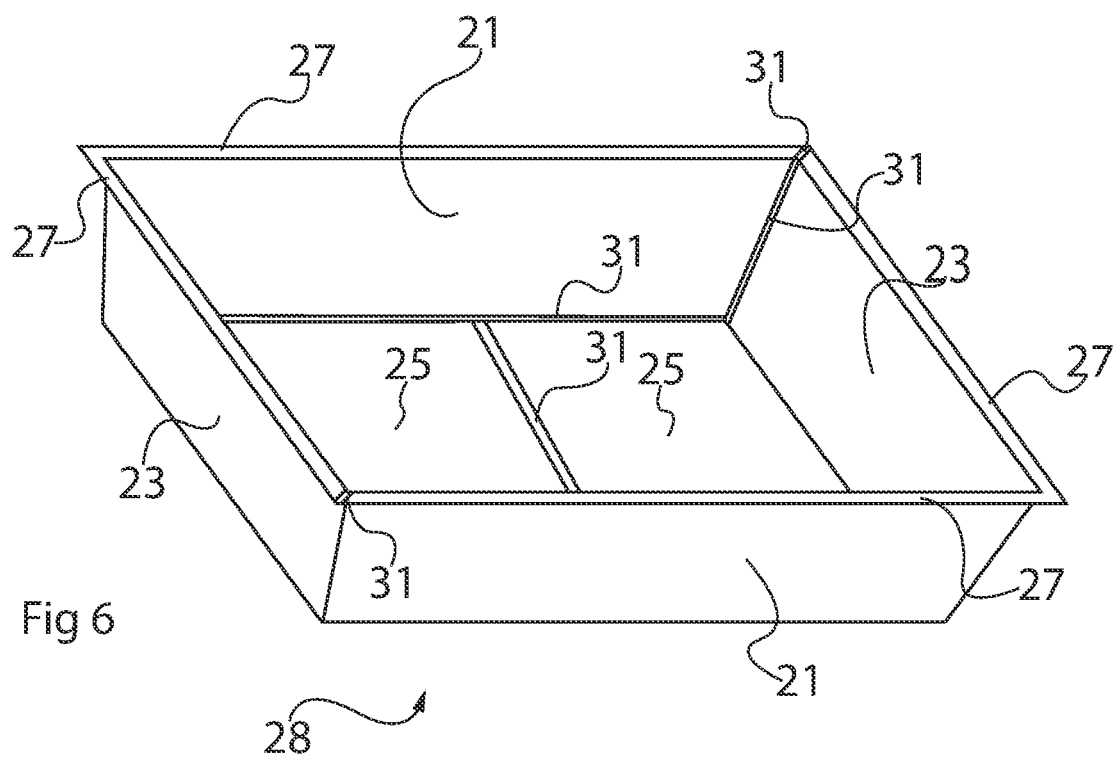
FIG. 6 schematically illustrates a container.

FIG. 6 illustrates schematically a container 28, formed as illustrated above, there is thus provided two sets of opposing side panels 21, 23, which are long and short side panels in this rectangular version of the container 28, although a square container where all side panels 21, 23 have the same size is also considered. It would also be possible to allow all side panels 21, 23 to be made in one piece with a part of the bottom panel 25, although in the illustrated case the bottom panels 25 extend from the short side panels 23. It would also be possible to form a container from four side panels being joined by a single unstretched portion if a wide sheet metal web can be provided.

In the illustrated case, welded overlaps 31 between panels are provided along the periphery of the long side panels 21 and in the middle of the bottom where the bottom panels meet.

In the following, the present disclosure is mainly concerned with how the rim 27 or upper frame is obtained, and this is mainly independent from how the exact layout of the panels is accomplished.

FIGS. 7A-7C illustrate a first adjustment of the precursor 20 illustrated in FIG. 3. As compared to the precursor in that drawing, a notch 33 is formed in the unstretched portion 13, as best seen in FIG. 7B showing enlarged the portion C in FIG. 7A. That notch or cut-out 33 weakens the rim 27, which is folded from the upper part of the unstretched portion 13, to some extent which means that when bent into a container corner, the rim 27 is deformed more easily and in a predictable manner. This is compared to a case without a notch 33 where it may be difficult to accomplish a small enough radius at the corner to fit well with the sharper corner below, where the panels meet. This is especially the case if a wide rim 27 is made.

The notch may typically be between 3 and 7 mm deep as seen from the upper edge, in the illustrated case 5 mm deep, and may be between 35 and 55 mm wide at its bottom.

The thickness of the sheet metal used may typically be 0.5-0.7 mm.

It is possible to provide a tab 35 projecting at the middle of the notch 33, if it is desired to have more material at the very corner that can be drawn out in the bending step to form a uniform flange around the corner. This tab 35 is, however, optional, and a version lacking the tab is considered, or with a smaller tab as shown in corresponding FIG. 7C. If a uniform flange around the corner is desired, the height and width of the tab is adapted to the corner radius.

Note that corresponding notches 33 may be provided also at the ends of the unstretched portion 13 where corners are formed with another precursor part.

A finished container 28 formed with notches as illustrated in FIG. 7C is shown in FIG. 8. As shown in the enlarged portion D, the flange formed in the rim 27 has a more or less uniform cross section throughout the bend in the corner and is not deformed in an unpredictable fashion. This is also seen in FIG. 10, illustrating the enlarged portion E of FIG. 9. In absence of the notch 33, the lower part 39 of the flange formed from the rim 27 would likely have formed a greater radius at the corner, thereby deforming the rim at this location in an unpredictable manner, potentially leading to a container that could be stuck, for instance if the container is slid into guides of a rack.

Figure 9:
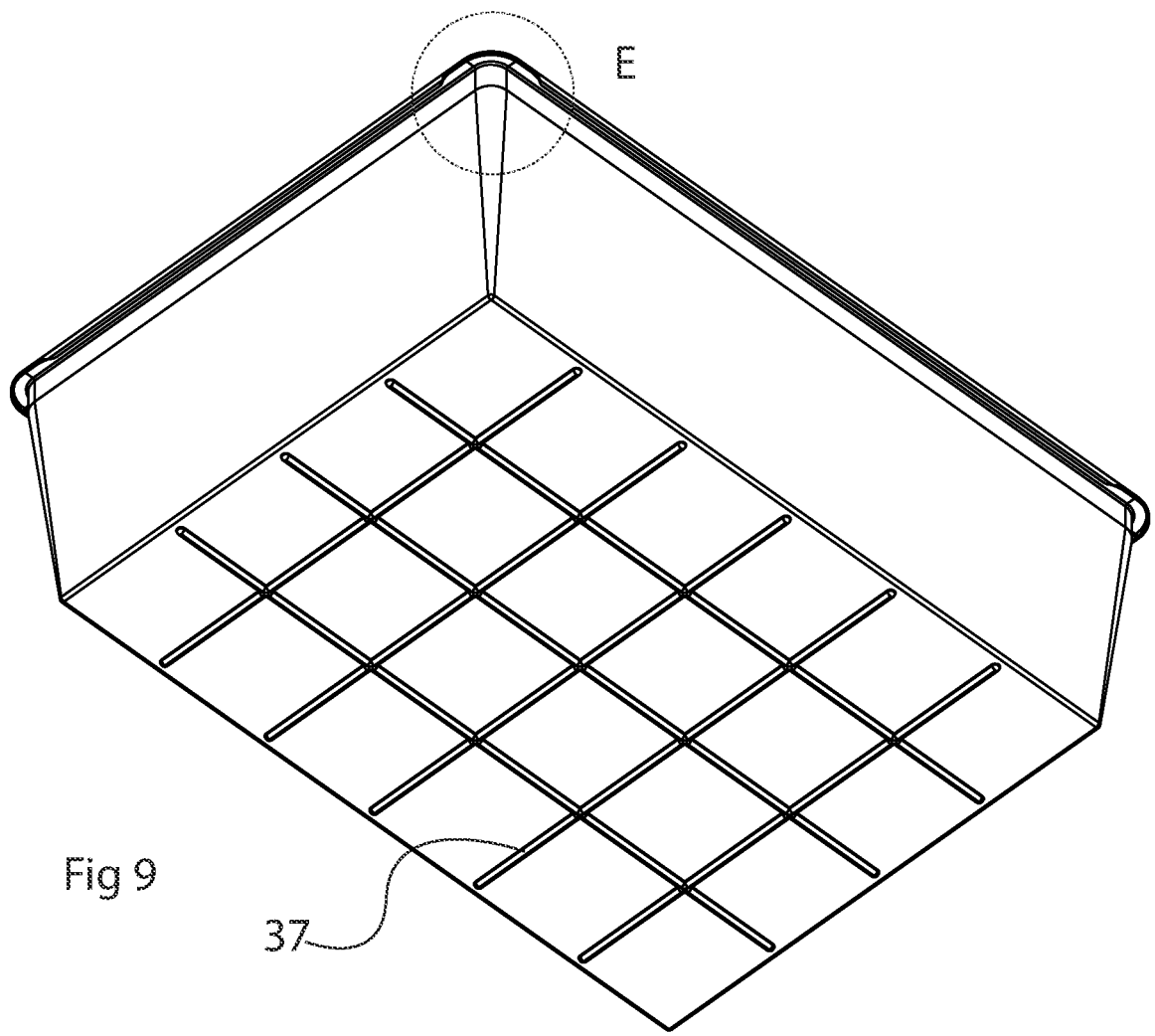
Figure 10:
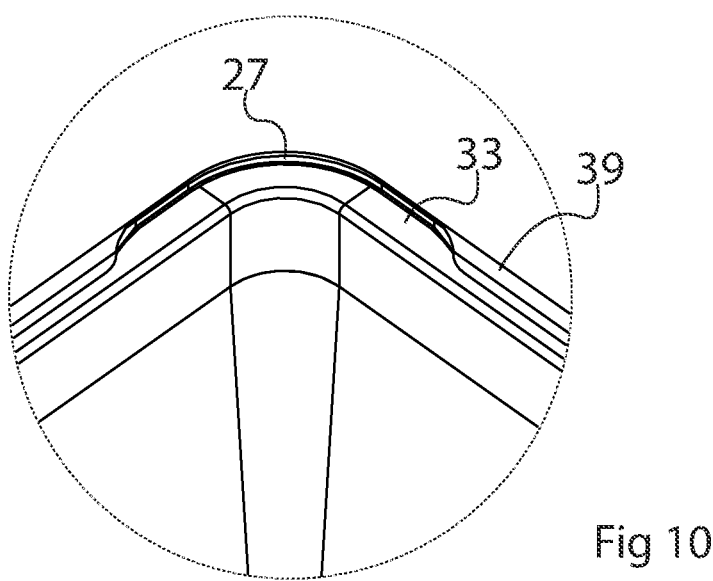
FIG. 10 shows an enlargement of the portion B of FIG. 9.

Illustrated in FIGS. 8 and 9 are also optional embossings or 37 formed in the bottom panel of the container, such as by stamping. These embossings 37 are, in this example, made to resemble the bottom of a legacy wire basket. They may also make the bottom panels stiffer. They may also be formed to conceal and strengthen the welded bottom panel joint 31 indicated in FIG. 6.

FIGS. 11 and 12 illustrate examples of different versions of rim 27 or upper frame cross-sections. It is noted with reference to FIG. 11 that the unstretched portion 13 may reach down over an upper part of the side panel 21 (this cross-section may be identical on the other side panel 23, cf. FIG. 6). The rim 27 is formed by a flange 41 bent approximately 90 degrees from the, at that location almost vertical, side panel forming an approximately horizontal surface, although it is possible to deviate significantly from horizontal. From the horizontal flange portion 41, an approximately downwards projecting flange portion 39 is bent, forming a flange width 43 in the range 8-14 mm, in the illustrated case approximately 11 mm. This further bending makes the rim 27 stiffer.

As shown in FIG. 12 it is possible to provide a wider flange and bend the downwards projecting flange portion 39 again, then forming a portion 45 projecting inwards, towards the side panel 21. This is then typically done as a final step, once the container has been assembled.

This forms a downwards facing surface which can facilitate gliding for instance in a slider of a rack carrying several containers. Also, the container may be carried more comfortably if heavily loaded. With this configuration the aforementioned notch 33 prevents the flange being deformed when bent to form a corner 29.

Figure 14:
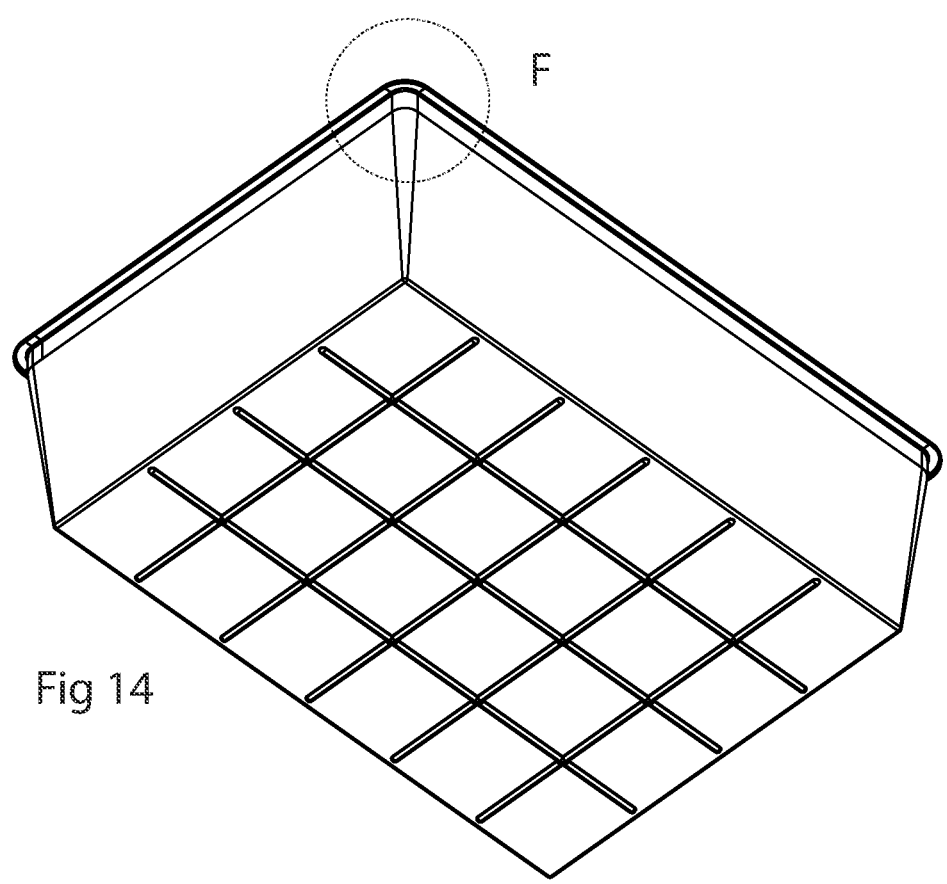
Figure 15:
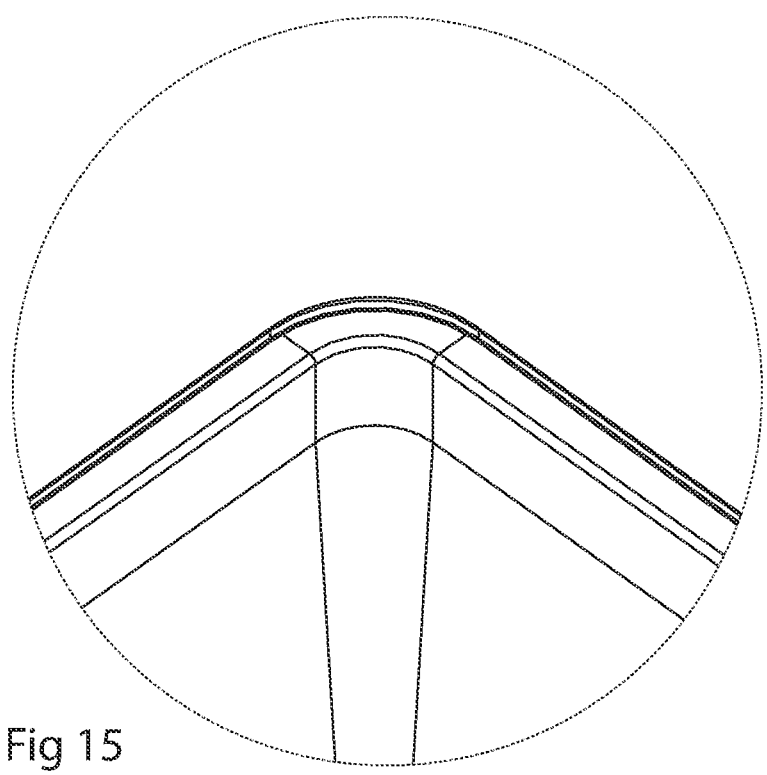

FIGS. 13, 14 and 15 illustrate, corresponding to FIGS. 7A, 9, and 10, the production of a container according to an alternative example. In this embodiment a rim portion 27 using a smaller part of the unstretched portion is considered. This is done by forming a downwards projecting flange portion 39 which is not finally bent inwards, towards the side panel. This means that a specific notch at the corners of the container is not needed as relatively less material need be bent when forming the corner, i.e., the flange at the corner already has the same dimensions as at the notch of FIG. 7A. However, a tab 35 projecting from the otherwise straight edge may still be preferred to avoid making the flange too thin when bent into the corner. This may also be provided at the unstretched portion intended to form the adjacent corner as shown. The tab may typically project 1-6 mm from the edge, in the illustrated case 5 mm. It may be tapering from the edge, in the illustrated case being triangular, and may be 25-40 mm wide at its base, in the illustrated case, approximately 30 mm. The tab illustrated in FIG. 7A may have the same dimensions.

The corresponding resulting container is shown in FIG. 14 and enlarged the portion F thereof in FIG. 15. As illustrated, the flange has about the cross section shown in FIG. 11 throughout the corner.

The present disclosure is not limited to the above examples and may be varied and altered in different ways within the scope of the appended claims.

The invention claimed is:

1. A method for producing a container made of a metal mesh, the container comprising a first and a second set of opposing side panels that form four sides of the container with four corners, a bottom panel joined to the first and second sets of opposing side panels, and a rim directed outwardly from upper edges of the side panels and extending around at least one of the four corners, wherein the method comprises:
   cutting at least one precursor from a web comprising a metal mesh portion and an unstretched metal portion, the precursor comprising both metal mesh and unstretched metal; and
   folding the at least one precursor to form in one piece at least a portion of the container, the portion of the container comprising at least two side panels, one from each of the first set and second sets of side panels, that are adjacent and form a corner, the at least two side panels being joined by the unstretched metal that is bent to form at least a portion of the rim the extends outwardly from the adjacent side panels and bent at a corner of the container defined by the adjacent side panels;
   wherein the precursor has a notch extending inwardly from an edge of the unstretched metal where the portion of the outwardly extending rim is bent at the corner of the container; and
   wherein the notch is formed with a tab in a middle of the notch.

2. The method according to claim 1, wherein the notch is formed when the precursor is cut from the web.

3. The method according to claim 1, wherein the tab projects 1-6 mm from a lower edge of the notch and is between 25-40 mm wide at its base.

4. The method according to claim 1, wherein the notch is between 3 and 7 mm deep, as measured from the edge of the unstretched metal of the precursor before a cut is made to form the notch.

5. The method according to claim 1, wherein the notch is between 35 and 50 mm wide along a lower edge of the notch.

6. The method according to claim 1, wherein a width of the notch tapers inwardly.

7. The method according to claim 1, further comprising forming a downwardly projecting flange along the portion of the outwardly extending rim, when the flange is formed by bending the unstretched metal forming the portion of the rim prior to bending the portion of the rim at the corner of the container.

8. The method according to claim 7, wherein an inwardly projecting portion is bent from the downwards projecting flange after bending the rim at the corner of the container.

9. The method of claim 1, wherein the web is produced by perforating a sheet metal web to form at least one perforated portion and at least one unperforated portion and expanding the at least one perforated portion along an expansion direction to form the at least one metal mesh portion and the at least one unstretched metal portion.

10. A method for producing a container in mesh material, the container comprising expanded sheet metal, the container having a first and a second set of opposing side panels, a bottom panel, and a rim directed outwards from upper edges of the side panels, the method comprising:

perforating and expanding a web of sheet metal along an expansion direction to form said mesh material, while leaving at least one portion of the web unstretched, cutting at least one precursor from the web, folding a container including said at least one precursor wherein said at least one precursor makes up, in one piece, at least a side panel in the first set of side panels and a side panel in the second set of side panels, which are joined by said unstretched portion which is bent to form a corner of the rim, wherein the unstretched portion is cut such that a tab projects from the edge of the unstretched portion where said corner of the rim is to be made.

11. The method according to claim 10, wherein the tab extends 1-6 mm from said edge and is between 25-40 mm wide at its base.

12. The method according to claim 10, wherein a notch is cut in the unstretched portion with the tab in a middle of the notch.

13. The method according to claim 12, wherein the notch is between 3 and 7 mm deep, as measured from the edge of the unstretched metal of the precursor before a cut is made to form the notch.

14. The method according to claim 12, wherein the notch is between 35 and 50 mm wide along a lower edge of the notch.

15. The method according to claim 12, wherein a width of the notch tapers inwardly.

16. The method according to claim 10, further comprising forming a downwardly projecting flange along the portion of the outwardly extending rim when the flange is formed by bending the unstretched metal forming the portion of the rim before bending the portion of the rim at the corner of the container.

17. The method according to claim 16, wherein an inwardly projecting portion is bent from the downwards projecting flange after bending the rim at the corner of the container.

* * * * *